US010708092B2

(12) United States Patent
Cox

(10) Patent No.: US 10,708,092 B2
(45) Date of Patent: Jul. 7, 2020

(54) METHODS AND APPARATUS FOR SOURCE AND LOAD POWER TRANSFER CONTROL

(71) Applicant: Photonic Systems, Inc., Billerica, MA (US)

(72) Inventor: Charles H. Cox, Carlisle, MA (US)

(73) Assignee: Photonic Systems, Inc., Billerica, MA (US)

( * ) Notice: Subject to any disclaimer, the term of this patent is extended or adjusted under 35 U.S.C. 154(b) by 0 days.

(21) Appl. No.: 15/989,824

(22) Filed: May 25, 2018

(65) Prior Publication Data
US 2018/0278439 A1   Sep. 27, 2018

Related U.S. Application Data

(62) Division of application No. 14/628,323, filed on Feb. 23, 2015, now Pat. No. 10,009,193.

(51) Int. Cl.
H04L 25/02        (2006.01)
(52) U.S. Cl.
CPC ................................ H04L 25/0278 (2013.01)
(58) Field of Classification Search
CPC ................................................... H04L 25/0278
See application file for complete search history.

(56) References Cited

U.S. PATENT DOCUMENTS

| 3,904,971 | A | 9/1975 | Delagrange |
| 4,642,646 | A | 2/1987 | Rogers |
| 4,937,466 | A | 6/1990 | Osterkamp |
| 5,038,112 | A * | 8/1991 | O'Neill ............... H03G 3/3047 330/207 P |
| 5,307,515 | A | 4/1994 | Kuo |
| 5,422,608 | A | 6/1995 | Levesque |
| 5,880,635 | A | 3/1999 | Satoh |
| 6,389,272 | B1 * | 5/2002 | Horigome ........... H03G 3/3068 455/232.1 |
| 6,961,552 | B2 * | 11/2005 | Darabi ................. H03G 3/3052 375/345 |
| 7,164,315 | B2 * | 1/2007 | Camnitz ............ G01R 31/3163 330/129 |
| 7,565,127 | B2 | 7/2009 | Tokairin |
| 8,008,982 | B2 | 8/2011 | McKinzie |
| 8,140,033 | B2 | 3/2012 | Po |
| 8,390,359 | B2 | 3/2013 | Meyer |
| 8,478,334 | B2 | 7/2013 | Iwai |

(Continued)

Primary Examiner — Thomas J. Hiltunen
(74) Attorney, Agent, or Firm — Rauschenbach Patent Law Group, LLC; Kurt Rauschenbach

(57) ABSTRACT

A power transfer electrical system includes an electrical signal source that generates a current at an output. An electrical load is electrically connected to the output of the electrical signal source. An output of a controllable voltage source is also electrically connected to the electrical load. The controllable voltage source generates a voltage that is proportional to the current generated by the electrical signal source. An input of a controller is electrically connected to the output of the electrical signal source and an output of the controller is electrically connected to a control input of the controllable voltage source. The controller generates a signal that controls the voltage generated by the controllable voltage source so that a desirable amount of power is transferred from the electrical signal source to the controllable voltage source.

19 Claims, 16 Drawing Sheets

(56) References Cited

U.S. PATENT DOCUMENTS

| | | | |
|---|---|---|---|
| 8,558,549 B2 * | 10/2013 | Yamamoto | G01R 31/2822 |
| | | | 324/500 |
| 8,624,654 B2 | 1/2014 | Sasho | |
| 8,749,319 B2 | 6/2014 | Rokhsaz | |
| 9,136,914 B2 * | 9/2015 | Von Novak | G06K 7/0008 |
| 9,385,666 B2 * | 7/2016 | Tam | H03F 1/3247 |
| 9,392,558 B2 * | 7/2016 | See | H04B 17/12 |
| 9,484,881 B2 * | 11/2016 | Suzuki | H03H 7/40 |
| 2002/0158688 A1 * | 10/2002 | Terosky | H03F 1/30 |
| | | | 330/129 |
| 2004/0198465 A1 * | 10/2004 | Nation | H04M 1/60 |
| | | | 455/573 |
| 2010/0327919 A1 * | 12/2010 | Oka | H03F 3/45183 |
| | | | 327/109 |
| 2011/0085625 A1 * | 4/2011 | Urakawa | H03G 1/0088 |
| | | | 375/345 |
| 2013/0253612 A1 | 9/2013 | Chow | |
| 2015/0123679 A1 | 5/2015 | Kuyvenhoven | |
| 2015/0145350 A1 | 5/2015 | Hajimiri | |
| 2015/0280429 A1 | 10/2015 | Makita | |

* cited by examiner

METHODS AND APPARATUS FOR SOURCE AND LOAD POWER TRANSFER CONTROL

CROSS-REFERENCE TO RELATED APPLICATION

This application is a divisional application of U.S. patent application Ser. No. 14/628,323, filed on Feb. 23, 2015 and entitled "Methods and Apparatus for Source and Load Power Transfer Control". The entire contents of U.S. patent application Ser. No. 14/628,323 is herein incorporated.

The section headings used herein are for organizational purposes only and should not to be construed as limiting the subject matter described in the present application in any way.

INTRODUCTION

It is highly desirable in most electrical systems to be able to control the transfer of electrical power between a source and a load. FIG. 1 illustrates the general shape of the dependence of the load power on the ratio of the load resistance $R_{Load}$ to the source resistance $R_{Source}$. The maximum power transfer theorem dictates that maximum power transfer from a source to a load occurs when the load impedance matches the source impedance, as shown in FIG. 1. Generally, the source and load impedances are complex and can be represented as $R_i \pm jX_i$, where i is the index representing source or load. For maximum power transfer, the complex impedances must form a conjugate match. Thus, both the resistive, $R_i$, components must be equal and the reactive, $X_j$, components must be equal, but of opposite sign; the conjugate match is often written as $Z_{Source} = Z_{Load}^*$. When referring to load impedance, the term "unmatched" means that the load impedance is something other than the complex conjugate of the antenna impedance.

For some systems, it is not desirable to have maximum power transfer from the source to the load during some or all modes of operation. In these systems, it is often desirable to have other particular power transfer ratios between the source and the load. In some systems, maximum power transfer between the source and the load is desired in some operating modes, while particular power transfer ratios between the source and the load are desired in other operating modes.

BRIEF DESCRIPTION OF THE DRAWINGS

The present teaching, in accordance with preferred and exemplary embodiments, together with further advantages thereof, is more particularly described in the following detailed description, taken in conjunction with the accompanying drawings. The skilled person in the art will understand that the drawings, described below, are for illustration purposes only. The drawings are not necessarily to scale, emphasis instead generally being placed upon illustrating principles of the teaching. The drawings are not intended to limit the scope of the Applicant's teaching in any way.

DESCRIPTION OF VARIOUS EMBODIMENTS

Figure 1:
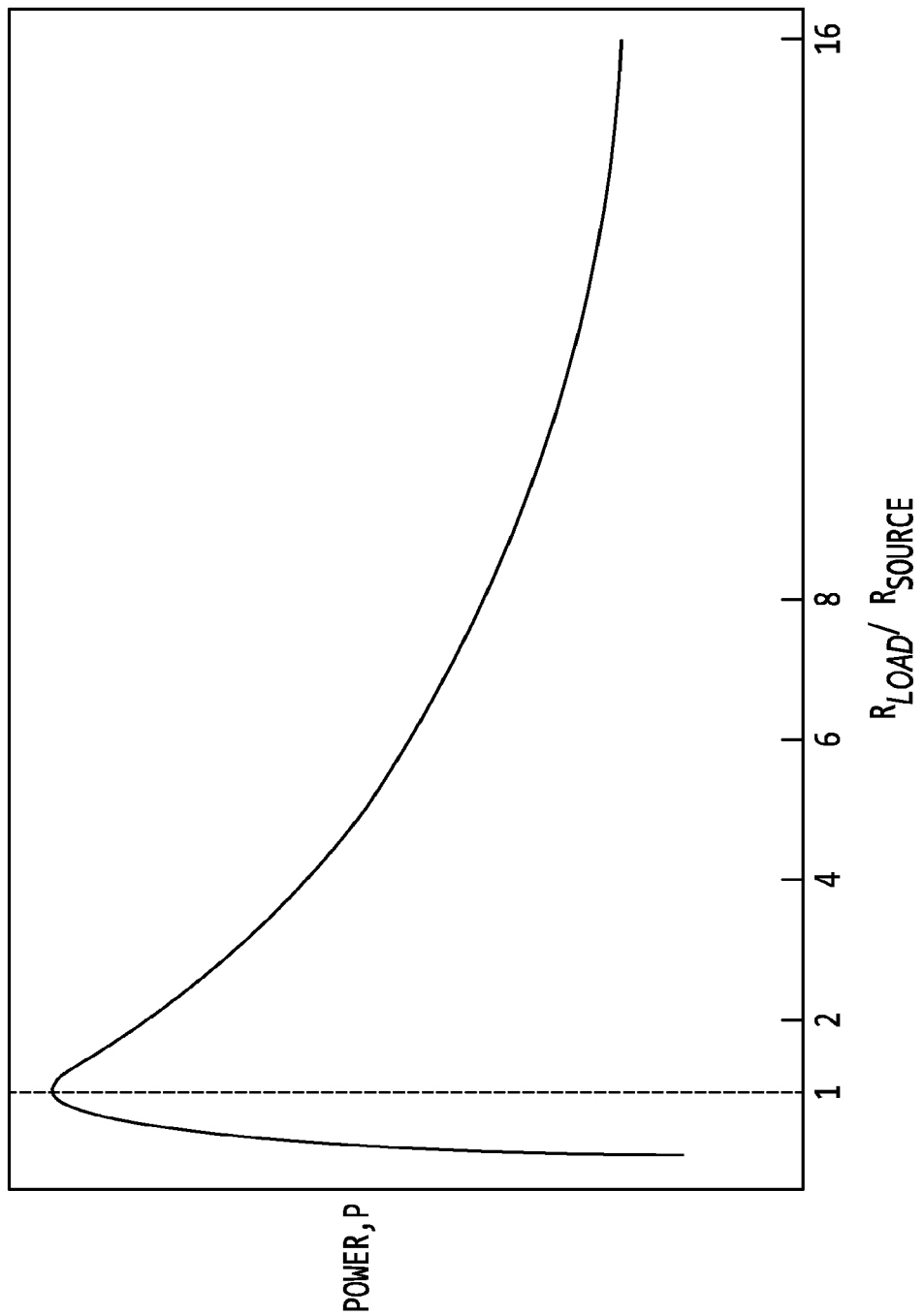
FIG. 1 illustrates a known power transfer curve as a function of the ratio of load resistance to source resistance.

Reference in the specification to "one embodiment" or "an embodiment" means that a particular feature, structure, or characteristic described in connection with the embodiment is included in at least one embodiment of the teaching. The appearances of the phrase "in one embodiment" in various places in the specification are not necessarily all referring to the same embodiment.

It should be understood that the individual steps of the methods of the present teachings may be performed in any order and/or simultaneously as long as the teaching remains operable. Furthermore, it should be understood that the apparatus and methods of the present teachings can include any number or all of the described embodiments as long as the teaching remains operable.

The present teaching will now be described in more detail with reference to exemplary embodiments thereof as shown in the accompanying drawings. While the present teachings are described in conjunction with various embodiments and examples, it is not intended that the present teachings be limited to such embodiments. On the contrary, the present teachings encompass various alternatives, modifications and equivalents, as will be appreciated by those of skill in the art. Those of ordinary skill in the art having access to the teaching herein will recognize additional implementations, modifications, and embodiments, as well as other fields of use, which are within the scope of the present disclosure as described herein.

Many single-signal communications system need to control the relative impedance between a source and a load and thus, the power transfer between the source and a load. Many communications systems desire maximum power transfer, but in other systems, it is desirable to have particular non-maximum-power-transfer power transfer ratios between the source and the load that can be fixed or variable for various applications.

Power transfer control in multi-signal communications systems is more complicated than power transfer control in single-signal communication systems. Some modern RF systems achieve lower cost and higher utility by using a single electrical antenna system that can provide a large number of RF signal formats, data modulation schemes, and operating frequencies. For these systems, it is difficult or impossible to determine a single fixed antenna load that is optimal for each of a wide variety of signals. Also, it is difficult for these multi-signal communications systems to efficiently receive a wide variety of incoming signals with a single receiver system. Furthermore, in some of these multi-signal systems, the incoming signals include a combination of high-power and low power signals and, in some particular systems, the difference in power levels between various signals can be several orders of magnitude. Thus, modern communication systems would benefit greatly from controllable source and load power transfer methods and apparatus that can accommodate a large number of multi-signal RF systems at various power levels.

One aspect of the present teaching is to provide a controllable load for an arbitrary source, such as an antenna source in one particular embodiment, that will enable the extraction of high power from some signals and lower power from others, even if the spectra of the high and low power signals overlap. Such a controllable load is particularly useful if the system needs to operate in an environment where there are both strong and weak signals because these controllable loads would permit transferring a maximum amount of power from weak signals while simultaneously transferring as little power as desired from strong signals.

For the purpose of illustrating the present teaching, several embodiments of the methods and apparatus of the present teaching are described in connection with control of power transfer between an antenna source and a load connected to the antenna. The load connected to the antenna is typically a receiver in an RF communication system. However, one skilled in the art will appreciate that the methods and apparatus of the present teaching applies to any electrical sources and loads. For example, one skilled in the art will appreciate that electrical sources and loads may include an AC or DC power source that is driving a motor load; an audio amplifier source driving a speaker load; or a transmit amplifier source driving an antenna load. One skilled in the art will appreciate that an antenna may act as a load on one system configuration, but in other system configurations, an antenna may act as a source. Consequently, one skilled in the art will appreciate that the following description of an antenna as a source in the detailed description is not in any way a limitation on the present teaching.

Known prior art systems provide a particular fixed power transfer between an antenna and its load by selecting a desired antenna load impedance that is determined as part of the overall system design. The present teaching is particularly useful for systems where multiple signals are simultaneously incident on the antenna and the power levels of those signals vary over a wide range. One aspect of the present teaching is to provide methods and systems that provide variable control of the load so that the antenna can beneficially operate with a plurality of signals.

Figure 2:
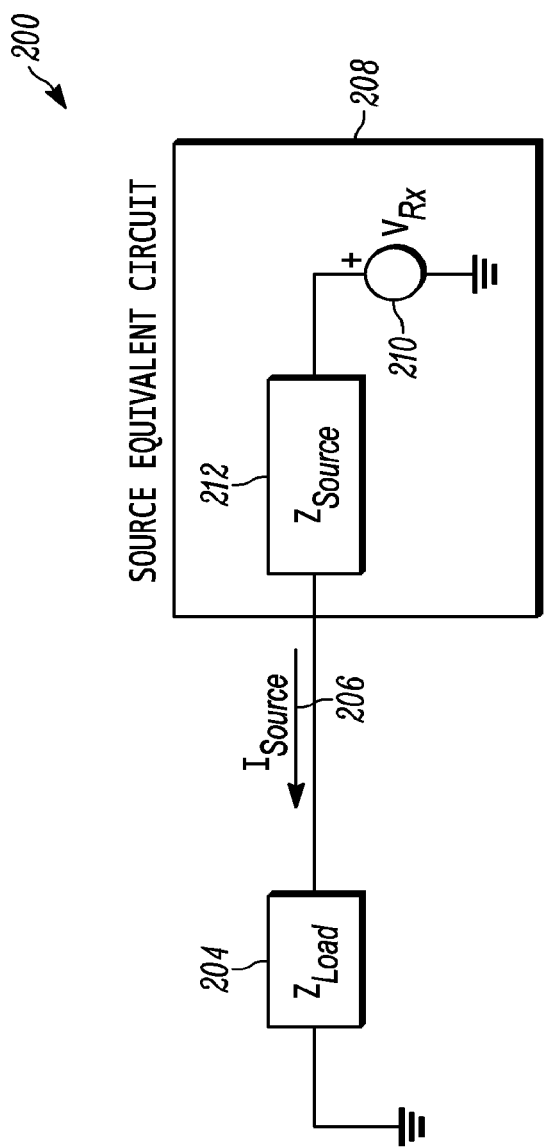
FIG. 2 illustrates a Thevenin equivalent circuit of a power transfer electrical system.

FIG. 2 shows a Thevenin equivalent circuit 200 of a power transfer electrical system. The electrical source is represented by the Thevenin equivalent circuit 208. The Thevenin equivalent circuit 208 comprises an independent active voltage source 210. The transfer of power from the active voltage source 210 to the load impedance 204 is represented by the power $P_{Load}$. The power $P_{Load}$ is determined by the values of the source impedance 212, $Z_{Source}$, and by the load impedance 204 $Z_{Load}$. For the case where the impedances 212 and 204 are real, the power transfer in the circuit shown in FIG. 2 can be described by the plot of load power as a function of the ratio of the load resistance $R_{Load}$ to the source resistance $R_{Source}$ shown in FIG. 1 The power to the load can be expressed mathematically as:

$$P_{Load} = \text{Re}\left\{\frac{V_{Rx}^2}{(Z_{Antenna} + Z_{Load})^2} Z_{Load}\right\}$$

where Re { } denotes the real part of the expression in braces. The variable $V_{Rx}^2$ is the square of the voltage supplied by the independent active voltage source 210. In the art, the load is sometimes referred to as a "sink", especially when the load can dissipate power.

To implement the apparatus of present teaching at least one controllable electrical element is required. This means that at least one of the impedances, or equivalently at least one of the admittances, in FIG. 2 must be made controllable. Alternatively, the controllable electrical element can be realized in the form of a controllable voltage source or a controllable current source, which can be added to the circuit shown in FIG. 2. It will be appreciated by those skilled in the art that an ideal source, such as a voltage or current source, cannot be realized in practice since it would have zero or infinite impedance, respectively. Consequently, any physically realizable source will have a finite, non-zero impedance, which will be in addition to the impedances/admittances that are specifically shown in the drawings.

Figure 3A:
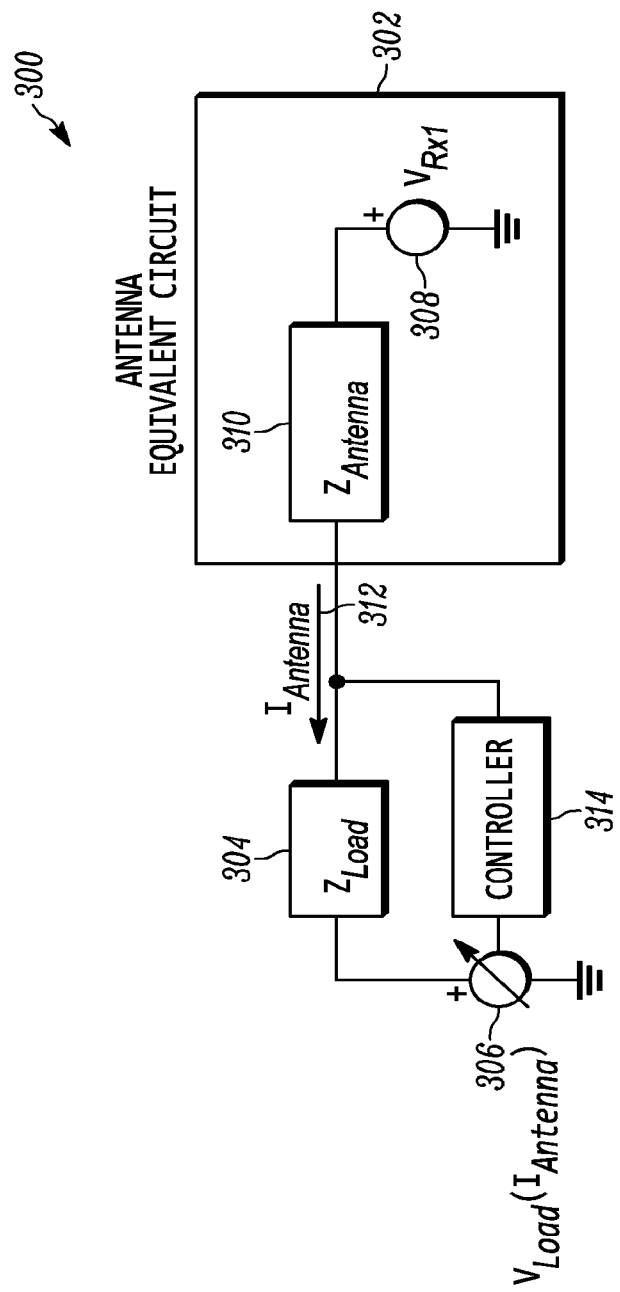
FIG. 3A illustrates a power transfer electrical system according to the present teaching that includes a single, independent-signal-source antenna, shown as an antenna Thevenin equivalent circuit electrically connected to a series combination of a fixed load impedance and a controllable voltage source.

FIG. 3A illustrates a power transfer electrical system 300 according to the present teaching that includes a single-signal antenna source, shown as an antenna Thevenin equivalent circuit 302 electrically connected to an electrical sink circuit, which in some embodiments comprises a series combination of a fixed load impedance 304 and a controllable voltage source 306. The antenna Thevenin equivalent circuit 302 is shown as an independent voltage source 308 that generates a voltage $V_{Rx1}$ in response to a received signal and a Thevenin antenna impedance $Z_{Antenna}$ 310. The antenna Thevenin equivalent circuit 302 generates an output current $I_{Antenna}$ 312. In this embodiment, the antenna Thevenin equivalent circuit 302 is designed to receive a single signal and then to generate the current $I_{Antenna}$ 312 in response to the reception.

The controllable voltage source 306 provides controllable power transfer between the antenna Thevenin equivalent circuit 302 and the fixed load impedance 304 according to the present teaching. The controllable voltage source 306 generates at an output a controllable voltage $V_{Load}$ that is a function of the current generated by the antenna Thevenin equivalent circuit 302, $I_{Antenna}$ 312.

A controller 314 has an input that is electrically connected to the output of the antenna Thevenin equivalent circuit 302 so that the current generated by the antenna Thevenin equivalent circuit 302, $I_{Antenna}$ 312, is sensed. An output of the controller 314 is electrically connected to a control input of the controllable voltage source 306. The controller 314 generates a signal in response to the value of the current generated by the antenna Thevenin equivalent circuit 302, $I_{Antenna}$ 312, which sets the output voltage of the controllable voltage source 306.

Those skilled in the art will appreciate that the antenna current $I_{Antenna}$ 312 is equal to the ratio of the difference between the voltage $V_{Rx1}$ generated by the independent voltage source 308 and the controllable voltage source $V_{Load}$ 306 to the sum of the Thevenin antenna impedance $Z_{Antenna}$ 310 and the fixed load impedance 304, as follows:

$$I_{Antenna} = \frac{V_{Rx1} - V_{Load}}{Z_{Antenna} + Z_{Load}}$$

where $V_{Load}(I_{Antenna}) = A(I_{Antenna}) V_{Rx1}$ where A is a complex constant, i.e. $Ae^{j\Phi}$. The function of the controller 314 is to determine a value or values of A that are a function of the current 312.

In the limiting case when the controllable voltage source 306 equals the antenna voltage source, i.e. $V_{Load}(I_{Antenna}) = V_{Rx1}$, the current between the controllable voltage source 306 and the voltage source 308 in the antenna Thevenin equivalent circuit 302 will be equal to zero. Under these conditions, the antenna will not accept any real power from the free-space field. Consequently, the antenna will reflect incident electromagnetic power back out into free space.

Figure 3B:
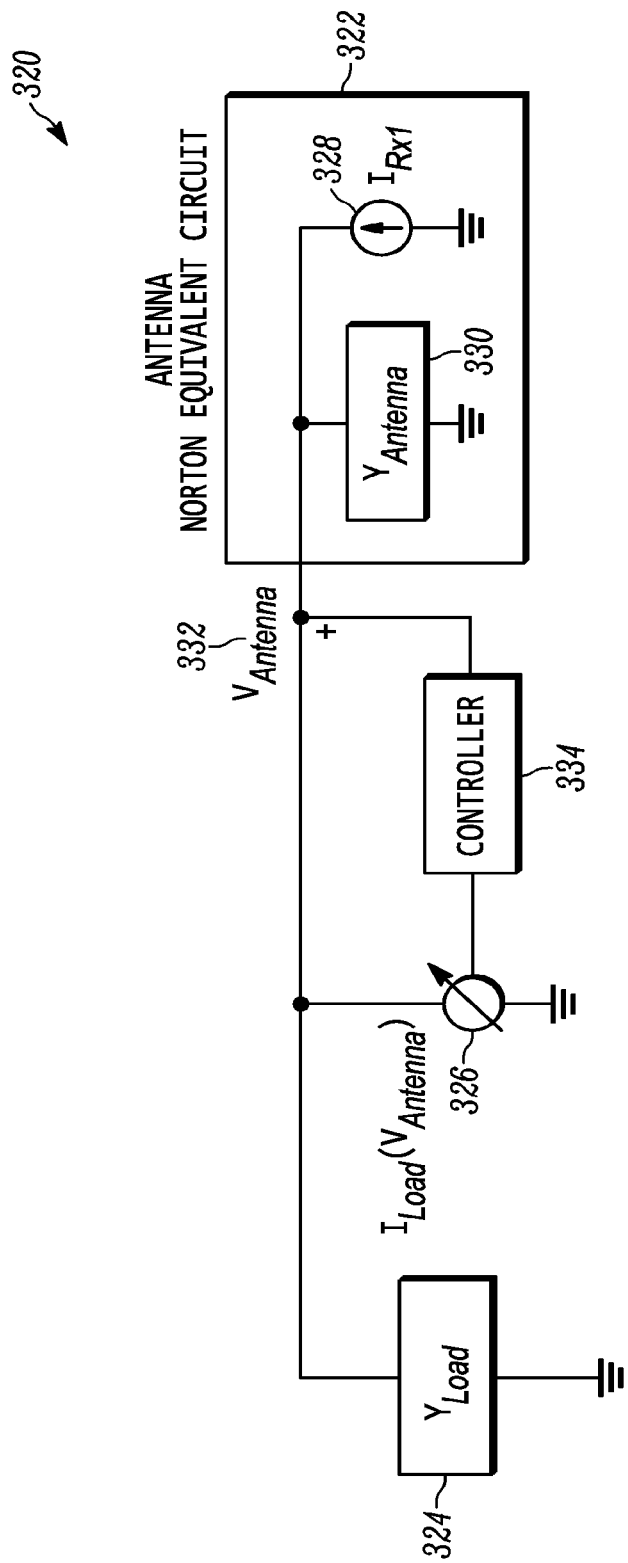
FIG. 3B illustrates a power transfer electrical system according to the present teaching that includes a single, independent-signal-source antenna, shown as an antenna Norton equivalent circuit electrically connected to a parallel combination of a fixed load admittance and a controllable current source.

The dual of the Thevenin equivalent circuit represented by a voltage source is the Norton equivalent circuit represented by current sources. FIG. 3B illustrates a power transfer electrical system 320 according to the present teaching that includes a single signal antenna source shown as an antenna Norton equivalent circuit 322 electrically connected to a sink circuit consisting of a parallel combination of a fixed load admittance 324 and a controllable current source 326. The antenna Norton equivalent circuit 322 is shown as an independent current source 328 that generates a current $I_{Rx1}$ in response to a received signal and a Norton antenna admittance $Y_{Antenna}$ 330. The antenna Norton equivalent circuit 322 generates an output voltage $V_{Antenna}$ 332. In this embodiment, the antenna Norton equivalent circuit 322 is designed to receive a single signal and then to generate the voltage $V_{Antenna}$ 332 in response to the reception.

The controllable current source 326 provides controllable power transfer between the antenna Norton equivalent circuit 322 and the fixed load admittance 324 according to the present teaching. The controllable current source 326 generates at an output a controllable current $I_{Load}$, which is a function of the voltage generated by the antenna Norton equivalent circuit 322, $V_{Antenna}$ 332.

A controller 334 has an input that is electrically connected to the output of the antenna Norton equivalent circuit 322 so that the voltage generated by the antenna Norton equivalent circuit 322, $V_{Antenna}$ 332, is sensed. An output of the controller 334 is electrically connected to a control input of the controllable current source 326. The controller 334 generates a signal in response to the value of the voltage generated by the antenna Norton equivalent circuit 322, $V_{Antenna}$ 332, that sets the output voltage of the controllable current source 326.

Thus, in general, the power transfer electrical system of the present teaching operates to transfer power from an electrical source circuit to an electrical sink circuit. In some embodiments, the electrical source comprises a current source 328 and source admittance 330. In other embodiments, the electrical source comprises a voltage source 308 and a source impedance 310. In some embodiments, the electrical sink circuit includes a controllable voltage source 306 and/or a controllable load impedance 534 (see FIG. 5C), which are controlled by the controller 538. In some embodiments, the electrical sink circuit includes a controllable current source 326 and/or a controllable load admittance (not shown), which are controlled by the controller 334. Furthermore, in some embodiments, the electrical elements in the sink circuit are fixed and the electrical source circuit comprises a controllable impedance that is controlled by the controller 550. See FIG. 5D.

Figure 4A:
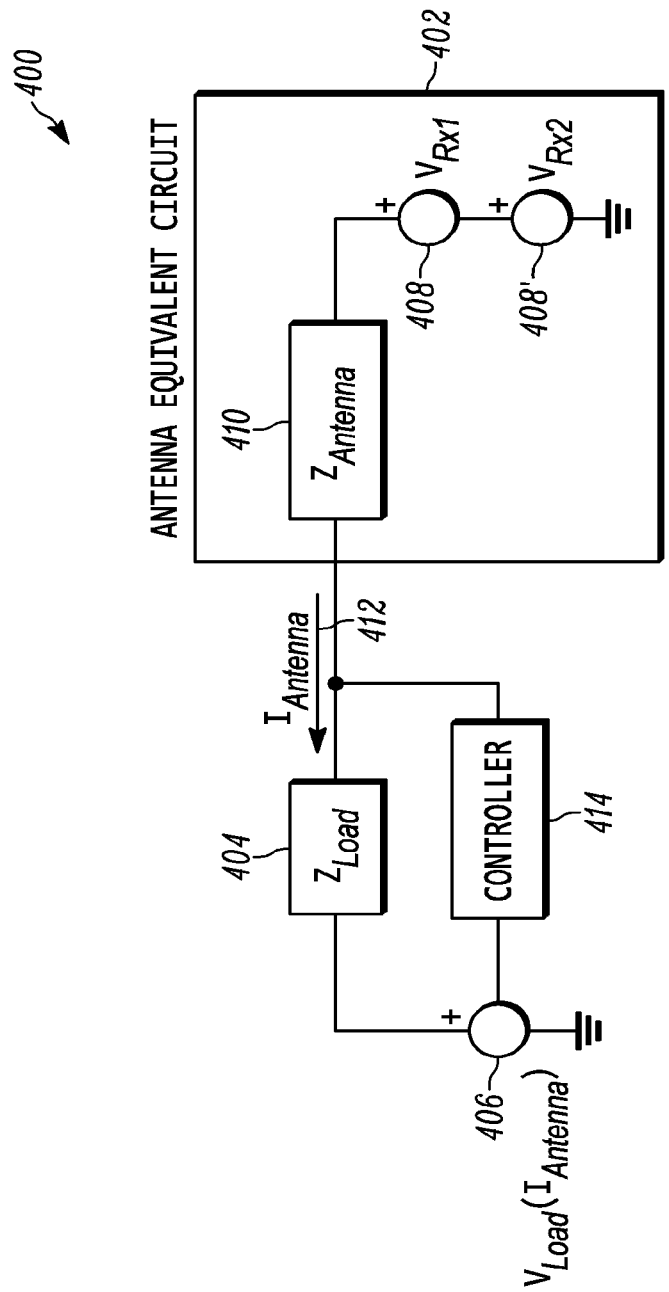
FIG. 4A illustrates a power transfer electrical system according to the present teaching that includes a multiple, independent-signal-source antenna, shown as an antenna Thevenin equivalent circuit electrically connected to a series combination of a fixed load impedance and a controllable voltage source.

FIG. 4A illustrates a power transfer electrical system 400 according to the present teaching that includes a multiple, independent-signal-source antenna, shown as an antenna Thevenin equivalent circuit 402 electrically connected to a sink circuit comprised of a series combination of a fixed load impedance 404 and a controllable voltage source 406. The power transfer electrical system 400 is similar to the power transfer electrical system 300 that was described in connection with FIG. 3A. However, the antenna Thevenin equivalent circuit 402 includes a Thevenin antenna impedance $Z_{Antenna}$ 410 and a series combination of a first voltage source 408 that generates a first voltage $V_{Rx1}$ in response to a first received signal and a second voltage source 408' that generates a second voltage $V_{Rx2}$ in response to a second received signal.

Thus, in this multi-signal embodiment, the antenna Thevenin equivalent circuit 402 is designed to receive multiple signals and then to generate the current $I_{Antenna}$ 312 in response to the multiple reception. More specifically, the antenna Thevenin equivalent circuit 402 generates an output current $I_{Antenna}$ 412 that is formed by driving the Thevenin antenna impedance $Z_{Antenna}$ 410 with a combination of the first voltage $V_{Rx1}$ in response to a first signal and the second voltage $V_{Rx2}$ in response to a the second signal.

The controllable voltage source 406 provides controllable power transfer between the antenna Thevenin equivalent circuit 402 and the fixed load impedance 404 according to the present teaching. The controllable voltage source 406 generates at an output a controllable voltage $V_{Load}(I_{Antenna})$, which is a function of the current generated by the antenna Thevenin equivalent circuit 402 $I_{Antenna}$ 410.

A controller 414 has an input that is electrically connected to the output of the antenna Thevenin equivalent circuit 402 so that the current generated by the antenna Thevenin equivalent circuit 402, $I_{Antenna}$ 412, is sensed. An output of the controller 414 is electrically connected to a control input of the controllable voltage source 406. The controller 414 generates a signal in response to the value of the current generated by the antenna Thevenin equivalent circuit 402, $I_{Antenna}$ 412, which sets the output voltage of the controllable voltage source 406.

The first and second independent voltage sources 408, 408' that generate the first and second voltages $V_{Rx1}$, $V_{Rx2}$ at the first and second signals, respectively, represent two independent active antenna electrical sources, one for each signal. These two independent active antenna electrical sources allow the source and load power transfer control system represented by the Thevenin equivalent circuit 402 of the power transfer electrical system 400 to be analyzed by superposition.

Figure 4B:
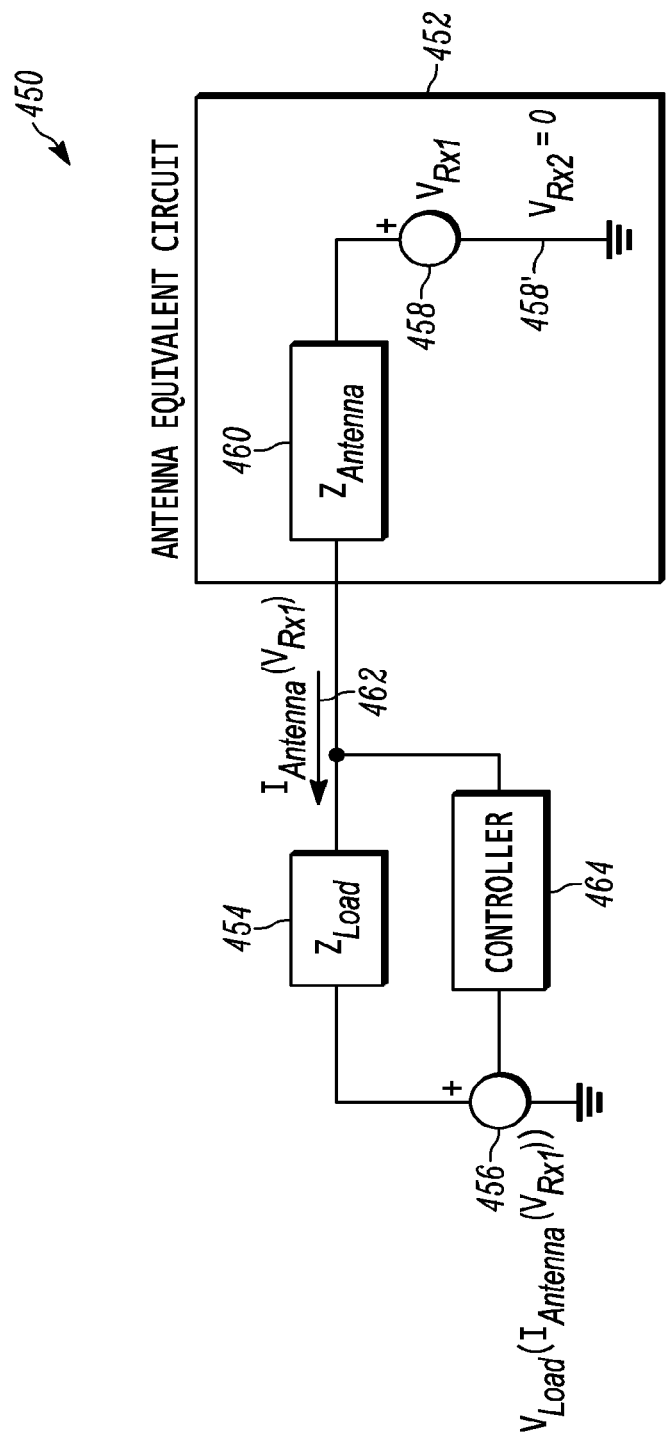
FIG. 4B illustrates the power transfer electrical system described in connection with FIG. 4A that includes the multiple, independent-signal-source antenna, shown as an antenna Thevenin equivalent circuit with the second voltage sources shorted so that the second voltage $V_{Rx2}$ equals zero.

FIG. 4B illustrates the power transfer electrical system 450 described in connection with FIG. 4A that includes the multiple, independent-signal-source antenna, shown as an antenna Thevenin equivalent circuit 452 with the second independent voltage source 458' shorted so that the second independent voltage $V_{Rx2}$ equals zero. Otherwise, the antenna Thevenin equivalent circuit 452 is identical to the antenna Thevenin equivalent circuit 402. In the power transfer electrical system 450, the first independent voltage source 458 is electrically connected to the Thevenin antenna impedance $Z_{Antenna}$ 460. The antenna Thevenin equivalent circuit 452 is electrically connected to a series combination of a fixed load impedance 454 and a controllable voltage source 456, which is electrically connected to a controller 464 as described in connection with FIG. 4A. Under these conditions, the first independent voltage source 458 is now feeding the load impedance 454 via the antenna impedance $Z_{Antenna}$ 460.

A response is first determined for the power transfer electrical system 450 with the second independent voltage $V_{Rx2}$ equal to zero or equivalently with the second voltage sources 458' being shorted. In this power transfer electrical system 450, the controllable voltage source 456 generates $V_{Load}$ that is a function of $I_{Antenna(VRx1)}$ that is generated by the antenna Thevenin equivalent circuit 452. The value of $V_{Load}$ is $V_{Load}=AV_{Rx1}$ where A is a complex constant, i.e. $Ae^{j\Phi}$.

Using the expression for the antenna current $I_{Antenna(VRx1)}$ described herein, the power dissipated by the load $P_{Load}$ resulting from the first voltage $V_{Rx1}$ can be expressed as:

$$P_{Load}(V_{R\times 1}) = \text{Re}\left\{\frac{V_{R\times 1}^2(1-A)^2}{(Z_{Antenna}+Z_{Load})^2}Z_{Load}\right\}$$

The equation for power dissipated by the load $P_{Load}$ in response to the first voltage source $V_{Rx1}$ can be controlled by adjusting the complex constant A. Thus, for example, the magnitude and phase of the signal received by the antenna in response to the first voltage source $V_{Rx1}$ can be made to be equal to zero, i.e. $|A|=1, \angle 0°$. Under this idealized condition, no power will be extracted from the first signal and all of the first signal power will be reflected by the antenna.

Figure 4C:
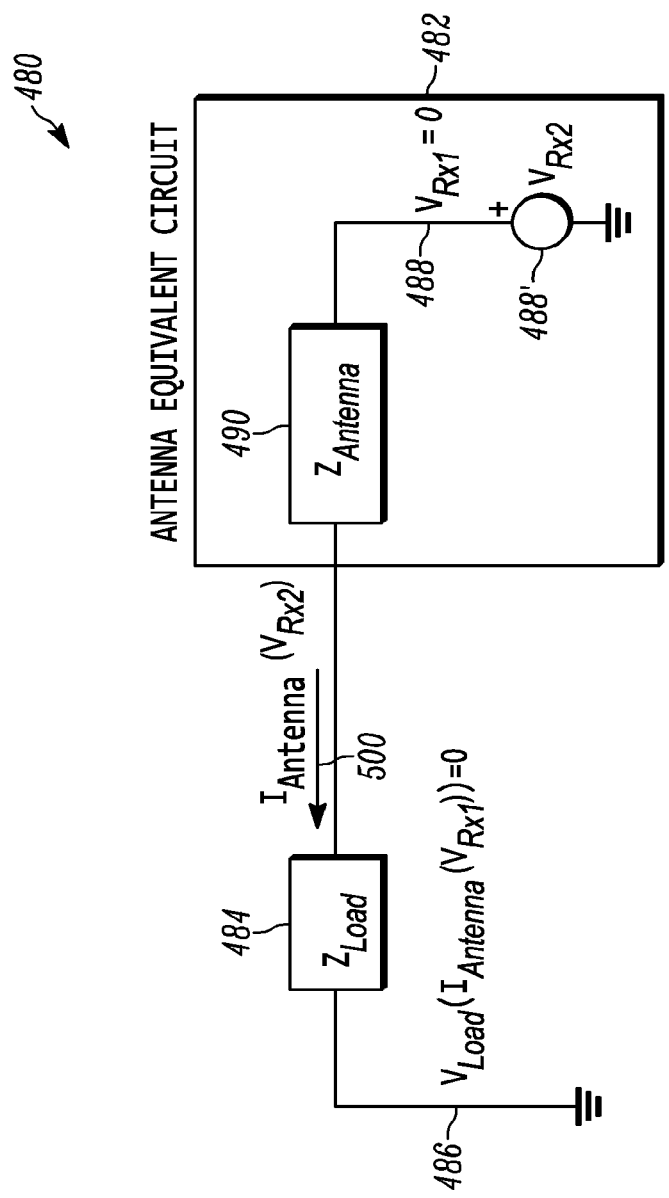
FIG. 4C illustrates the power transfer electrical system described in connection with FIG. 4A that includes the multiple, independent-signal-source antenna, shown as an antenna Thevenin equivalent circuit with the first voltage sources shorted so that the first voltage $V_{Rx1}$ equals zero.

FIG. 4C illustrates the power transfer electrical system 480 described in connection with FIG. 4A that includes the multiple, independent-signal-source antenna, shown as an antenna Thevenin equivalent circuit 482 with the first independent voltage source 488 shorted so that the first voltage $V_{Rx1}$ equals zero. As with the power transfer electrical system 400 described in connection with FIG. 4A, the antenna Thevenin equivalent circuit 482 is identical to the antenna Thevenin equivalent circuit 402 where the second independent voltage source 488' is electrically connected to the Thevenin antenna impedance $Z_{Antenna}$ 490. The antenna Thevenin equivalent circuit 482 is electrically connected to a series combination of a fixed load impedance 484 and a controllable voltage source 486 as described in connection with FIG. 4C. Under these conditions the second independent voltage source 488' is now feeding the load impedance 484 via the antenna impedance $Z_{Antenna}$ 490.

Using the expression for the antenna current $I_{Antenna(VRx2)}$ described herein, the power dissipated by the load $P_{Load}$ resulting from the second voltages $V_{Rx2}$ can be expressed as:

$$P_{Load}(V_{R\times 2}) = \text{Re}\left\{\frac{V_{R\times 2}^2}{(Z_{Antenna}+Z_{Load})^2}Z_{Load}\right\}$$

The equation for power dissipated by the load $P_{Load}$ indicates that when $V_{Load}$ 486 equals zero, the power extracted from the antenna second voltage source 488 is determined only by the values of $Z_{Antenna}$ and $Z_{Load}$, but is independent of the value of A. When the power transfer electrical system of the present teaching is configured for maximum power transfer for the second signal, the load impedance $Z_{Load}$ 484 would be designed to be the complex conjugate of the antenna impedance $Z_{Antenna}$ 490, i.e. $Z_{Antenna}=Z_{Load}*$.

Using the expression for the antenna current $I_{Antenna}$ described herein, the power dissipated by the load $P_{Load}$ resulting from the first and second voltages $V_{Rx1}$, $V_{Rx2}$, when both the first and second voltage sources 488, 488' are active, can be expressed as the sum of the two responses each calculated with one source active:

$$P_{Load}(\text{Total}) =$$
$$P_{Load}(V_{R\times 1}) + P_{Load}(V_{R\times 2}) = \text{Re}\left\{\frac{V_{R\times 1}^2(1-A)^2+V_{R\times 2}^2}{(Z_{Antenna}+Z_{Load})^2}Z_{Load}\right\}$$

Thus, in dual-signal modes of operation, when the first and the second independent voltage sources 488, 488' are active, the power transfer electrical systems of the present teaching can be adjusted to reflect some portion of the first voltages $V_{Rx1}$ while simultaneously extracting some other portion of the second voltage signal $V_{Rx2}$. Similarly, in multi-signal modes of operation when a plurality of independent voltage sources are active, the power transfer electrical systems of the present teaching will reflect some portions of some voltages signals while simultaneously extracting some portions of other voltage signals. One skilled in the art will appreciate that the present teachings can be applied to transfer power from a source to a load with signals having any number of signals as well as with varying power levels.

Referring back to FIGS. 3A and 3B, the embodiments of power transfer apparatus described in connection with FIGS. 3A and 3B are general configurations for controlling the transfer of power between a source and a load. However, one skilled in the art will appreciate that there are other configurations that may be useful in certain applications. In some embodiments of the source and load power transfer control apparatus of the present teaching, there is either a source impedance or a load impedance, but not both a source and a load impedance, as described further in connection with FIGS. 5A-5B.

Figure 5A:
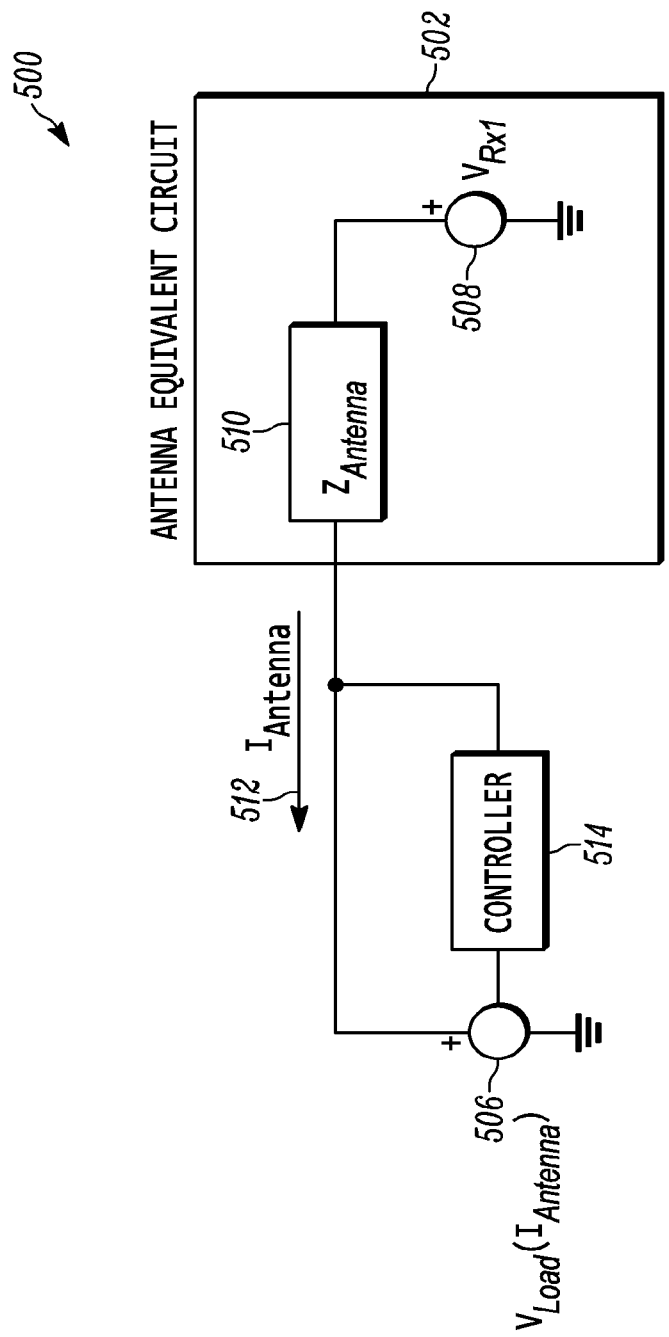
FIG. 5A illustrates an embodiment of a power transfer electrical system according to the present teaching with no load impedance.

FIG. 5A illustrates an embodiment of a power transfer electrical system 500 according to the present teaching that includes a single signal antenna source, shown as an antenna Thevenin equivalent circuit 502 electrically connected to a controllable voltage source 506 with no load impedance. The antenna Thevenin equivalent circuit 502 is shown as an independent voltage source 508 that generates a voltage $V_{Rx1}$ in response to a received signal and a Thevenin antenna impedance $Z_{Antenna}$ 510. The antenna Thevenin equivalent circuit 502 generates an output current $I_{Antenna}$ 512. In this embodiment, the antenna Thevenin equivalent circuit 502 is designed to receive a single signal and then to generate the current $I_{Antenna}$ 512 in response to the reception of the single signal.

A controller 514 has an input that is electrically connected to the output of the antenna Thevenin equivalent circuit 502 so that the current generated by the antenna Thevenin equivalent circuit 502, $I_{Antenna}$ 512, is sensed. An output of the controller 514 is electrically connected to a control input of the controllable voltage source 506. The controller 514 generates a signal in response to the value of the current generated by the antenna Thevenin equivalent circuit 502, $I_{Antenna}$ 512, which sets the output voltage of the controllable voltage source 506.

Figure 5B:
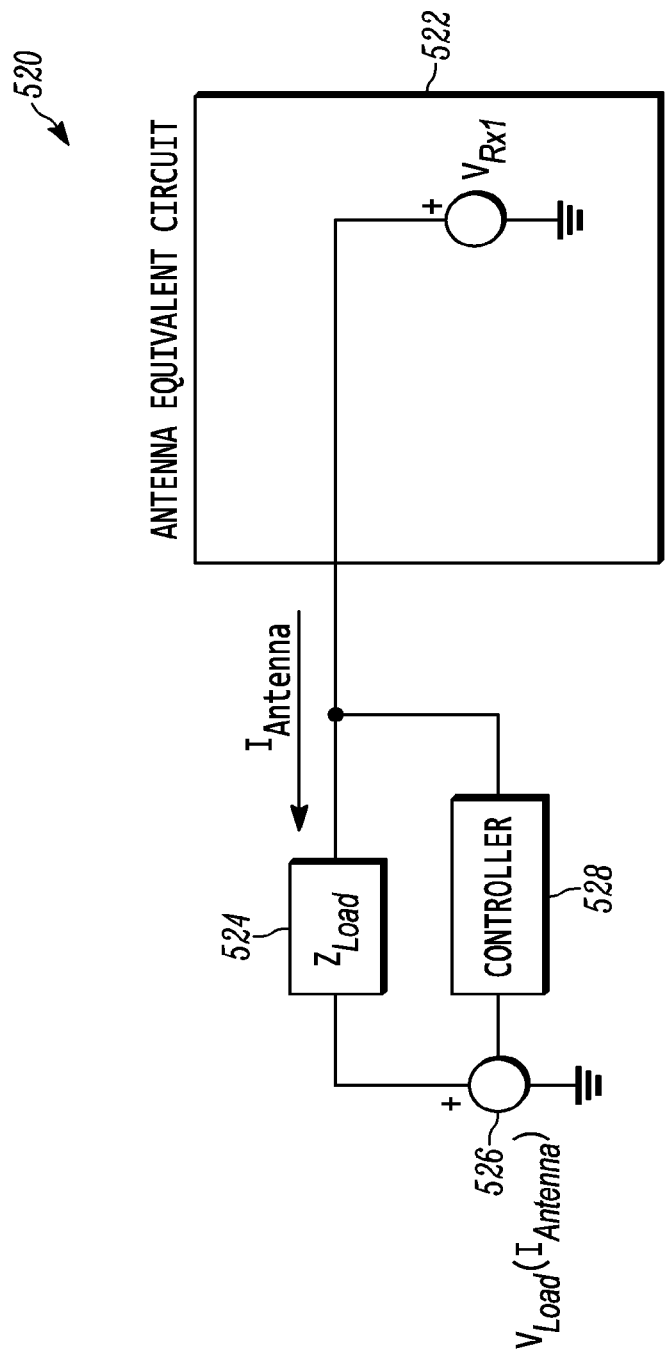
FIG. 5B illustrates an embodiment of a power transfer electrical system according to the present teaching with no source impedance.

FIG. 5B illustrates an embodiment of a power transfer electrical system 520 according to the present teaching that includes a single signal antenna source, shown as an antenna Thevenin equivalent circuit 522 electrically connected to a controllable voltage source 526 through a load impedance 524 with no source impedance. A controller 528 has an input electrically connected to the output of the antenna Thevenin equivalent circuit 522 and an output that is electrically connected to a control input of the controllable voltage source 526.

Figure 5C:
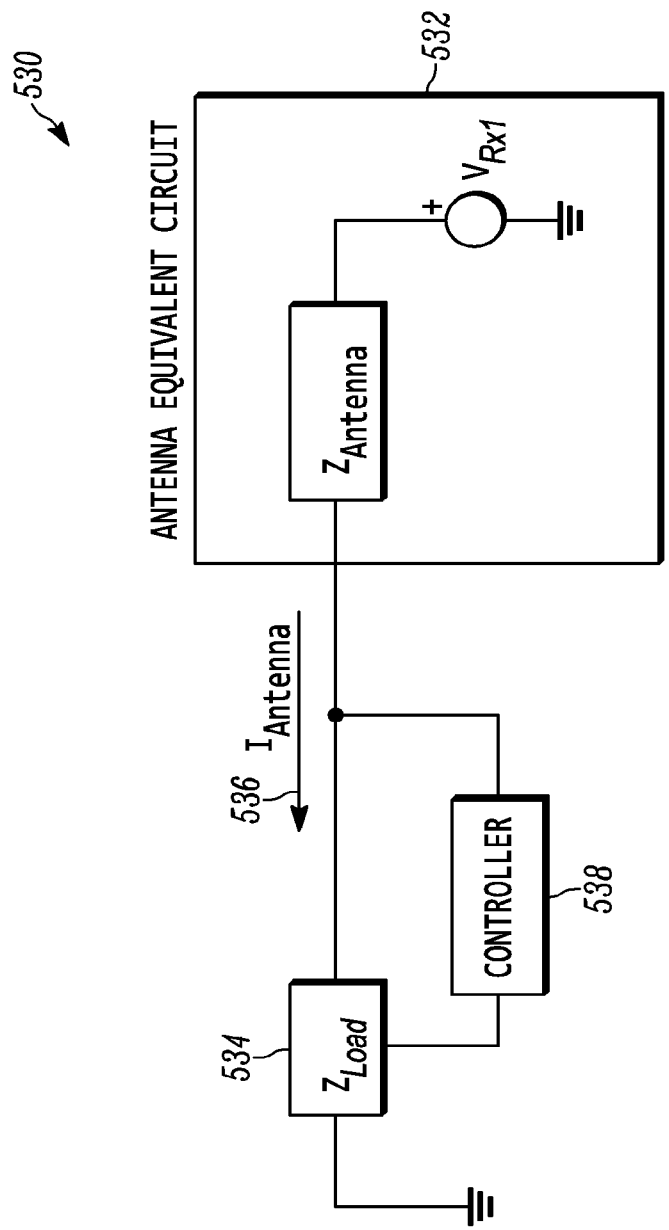
FIG. 5C illustrates an embodiment of a power transfer electrical system according to the present teaching with a controllable load impedance.

In some embodiments, the impedances are controlled rather than the voltage or current sources. FIG. 5C illustrates an embodiment of a power transfer electrical system 530 according to the present teaching that includes a single signal antenna source shown as an antenna Thevenin equivalent circuit 532 electrically connected to an impedance 534 with no controllable voltage source. In this embodiment, the load impedance 534 is controlled based on the antenna equivalent current 536. A controller 538 has an input electrically connected to the output of the antenna Thevenin equivalent circuit 532 and an output that is electrically connected to a control input of the load impedance 534.

Figure 5D:
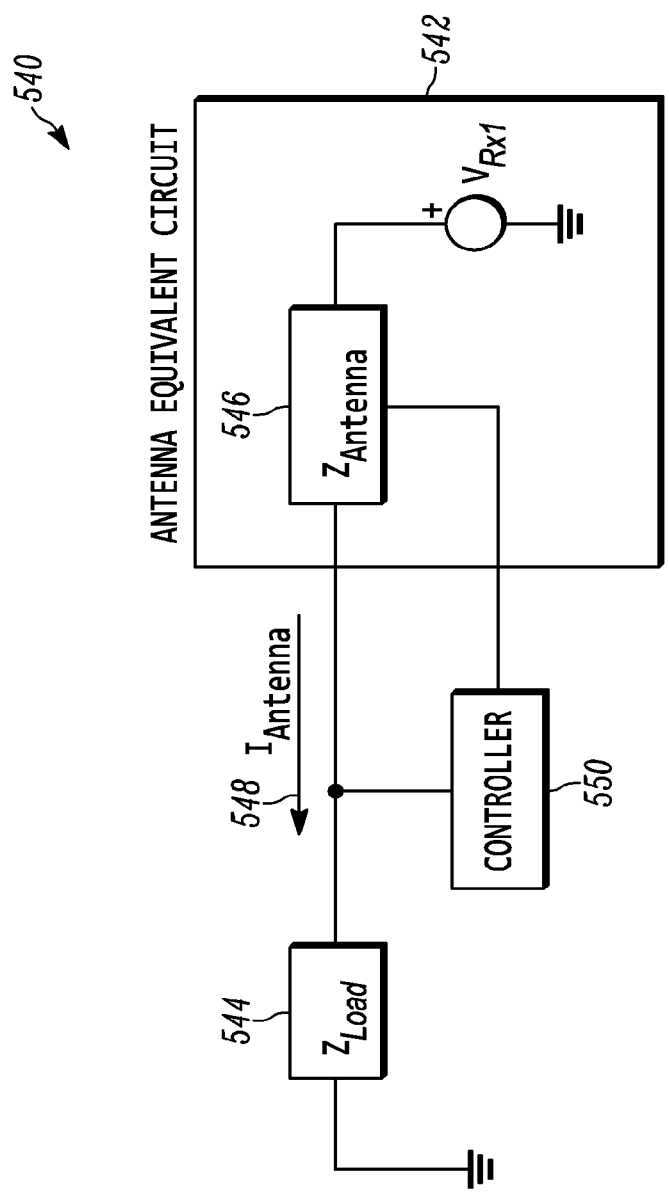
FIG. 5D illustrates an embodiment of a power transfer electrical system according to the present teaching with a controllable source impedance.

FIG. 5D illustrates an embodiment of a power transfer electrical system 540 according to the present teaching that includes a single-signal antenna source, shown as an antenna Thevenin equivalent circuit 542 electrically connected to a load impedance 544 with no controllable voltage source. In this embodiment, the source impedance 546 is controlled based on the antenna equivalent current 548. A controller 550 has an input electrically connected to the output of the antenna Thevenin equivalent circuit 542 and an output that is electrically connected to a control input of the source impedance 546.

Figure 5E:
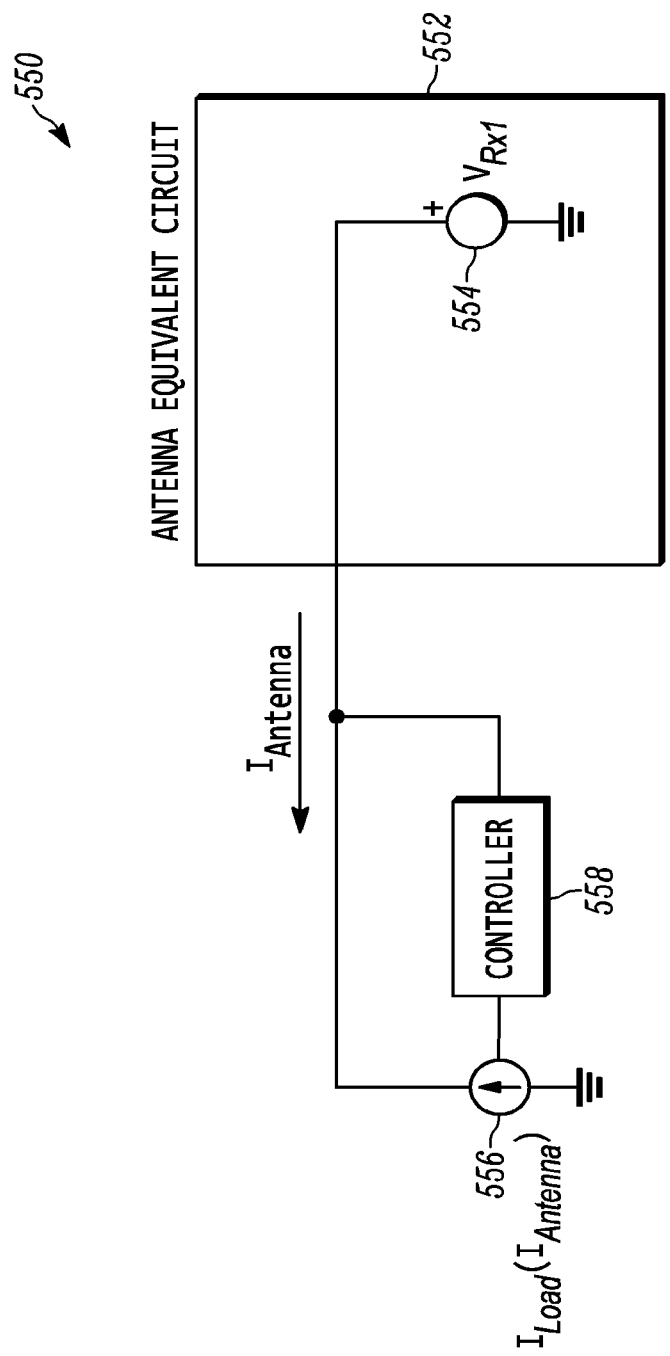
FIG. 5E illustrates an embodiment of a power transfer electrical system according to the present teaching with no impedances.

FIG. 5E illustrates an embodiment of a power transfer electrical system 550 according to the present teaching that includes a single-signal antenna source, shown as an antenna Thevenin equivalent circuit 552 with no source impedance, electrically connected to a controllable current source 556 with no load impedance. In this embodiment, the single signal antenna source shown is a voltage source, and the controllable source is a current source. A controller 558 has an input electrically connected to the output of the antenna Thevenin equivalent circuit 552 and an output that is electrically connected to a control input of the current source 556. Thus, one aspect of the present teaching is that power transfer electrical systems can be constructed with no impedances, provided that the independent source and the controllable source are each one of a voltage source and a current source, but not both current sources or both voltage sources.

Another aspect of the present teaching is to provide methods and systems that provide variable control of the load so that the antenna can beneficially operate at various power levels, even power levels that are different by orders of magnitude. The problem of transferring power from a source to a load with signals having different power levels is that it is generally desirable when detecting low-power signals to have the antenna load at a value that extracts the maximum power. For maximum power transfer, it is well known that the antenna load impedance must be the complex conjugate of the antenna impedance. In contrast, it may not be desirable, or even practical, to extract the maximum power from a source to a load with high power signals. In high power systems, it is highly desirable to have controllable power transfer methods and apparatus that present variable antenna load impedances that are unmatched in order to maintain desired power levels to the receiver.

Thus, one feature of the source and load power transfer control method and apparatus of the present teaching is that they can provide controllable antenna loads for an arbitrary source that will enable the extraction of high power from some signals and lower power from other signals, even if the spectra of the high and low power signals overlap. In one embodiment, the electrical system according to the present teaching beneficially permits transferring as much power to a receiver system load as desired from weak signals while simultaneously transferring as little power as desired from strong signals. In one specific embodiment of the power transfer electrical system of the present teaching, the electrical system can operate near-optimally in an environment where there are both strong and weak signals that can differ in power by orders of magnitude.

In some embodiments of the power transfer electrical system of the present teaching, the dependent load voltage source equals the antenna independent voltage source, i.e. $V_{Load}(I_{Antenna})=V_{Rx1}$. One consequence of this condition is that the voltage at the node between $Z_{Load}$ and $Z_{Antenna}$ will also be at this potential, which is sometimes referred to as a common mode voltage. A high common mode voltage can make it difficult to extract the second voltage signal $V_{Rx2}$, especially if the first voltage signal $V_{Rx1}$ is much greater than the second voltage signal $V_{Rx2}$. Thus, one aspect of the present teaching is to suppress undesirable high common mode voltage by using a differencing circuit.

Figure 6:
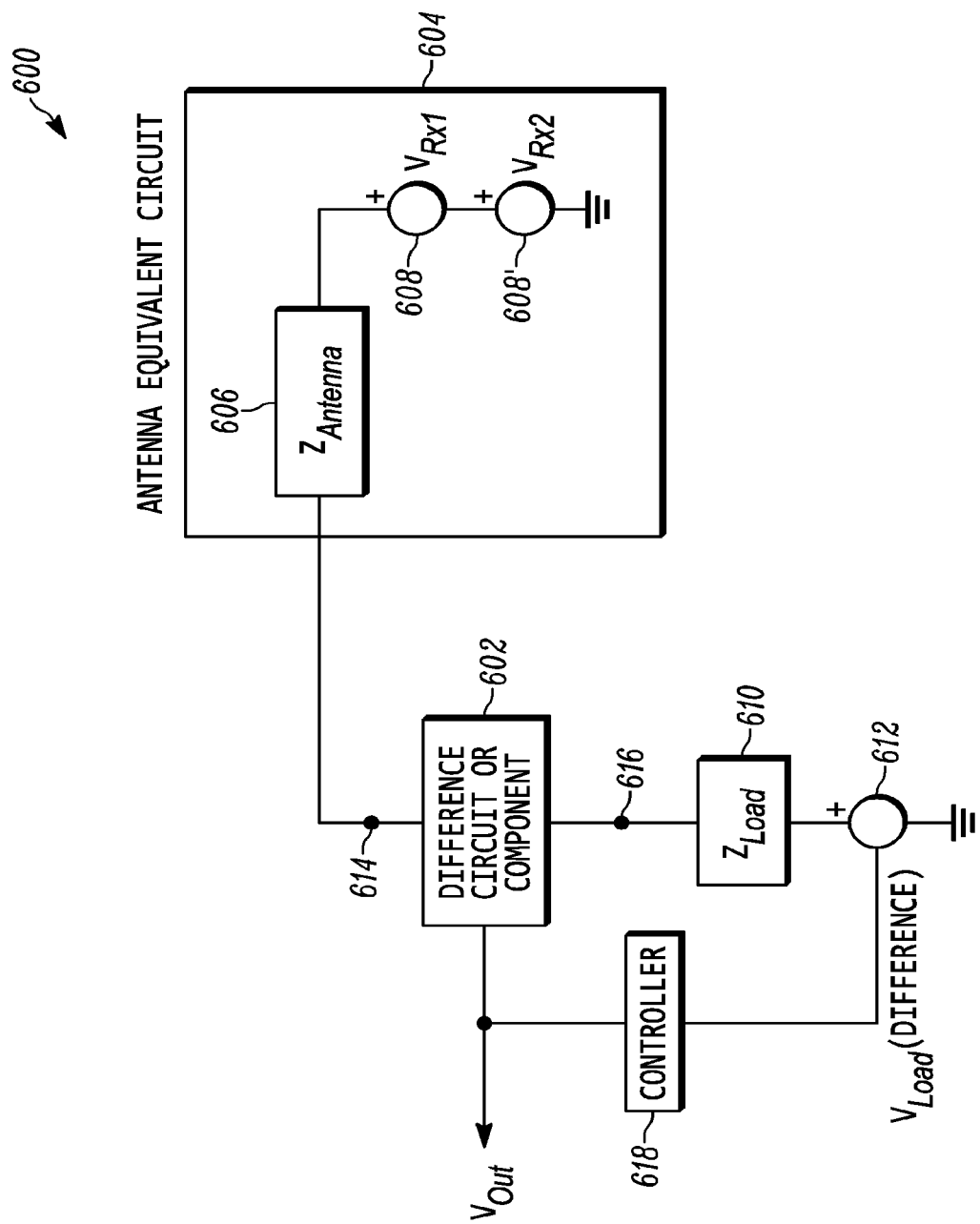
FIG. 6 illustrates a power transfer electrical system according to the present teaching that includes a difference circuit.

FIG. 6 illustrates a power transfer electrical system 600 according to the present teaching that includes a difference circuit 602. The power transfer electrical system 600 includes an antenna Thevenin equivalent circuit 604, similar to the antenna Thevenin equivalent circuit 402 that was described in connection with FIG. 4A. The antenna Thevenin equivalent circuit 604 includes a Thevenin antenna impedance $Z_{Antenna}$ 606 and a series combination of a first independent voltage source 608 that generates a first voltage $V_{Rx1}$ in response to a first received signal and a second independent voltage source 608' that generates a second voltage $V_{Rx2}$ in response to a second received signal.

The antenna Thevenin equivalent circuit 604 is electrically connected to a first input 614 of the difference circuit 602. The difference circuit 602 is a three terminal device with a first and second input and an output. A series combination of a fixed load impedance $Z_{load}$ 610 and a controllable voltage source 612 is electrically connected to the second input 616 of the difference circuit 602. The output of the difference circuit 602 provides a voltage output of the power transfer electrical system 600.

One skilled in the art will appreciate that numerous types of differencing circuits can be used with the power transfer electrical system 600. Some examples are described in connection with FIGS. 7A-7C. In various embodiments, differencing circuits can generate outputs that are based on the electrical difference between two powers, two voltages, two currents, and/or a voltage and a current. In one particular embodiment, the differencing circuit 602 generates an output voltage $V_{out}$ that is proportional to the difference between the output voltage of the antenna Thevenin equivalent circuit 604 electrically connected to the first input and the output of the series combination of the fixed load impedance $Z_{load}$ 610 and the controllable voltage source 612 that is electrically connected to the second input 616.

A controller 618 having an input that is electrically connected to the output of the differencing circuit 602 and an output that is electrically connected to a control input of the controllable voltage source 612 generates a control signal that determines the output voltage of the controllable voltage source 612 in response to the output of the differencing circuit 602. Thus, in this embodiment, the output of the differencing circuit 602 can be represented as:

$$V_{out} \propto V_{Rx1} + V_{Rx2} - V_{load} = V_{Rx1}|_{Vload=VRx1}.$$

One advantage of the power transfer electrical system 600 is that the common voltage can, in principle, be completely suppressed.

Figure 7A:
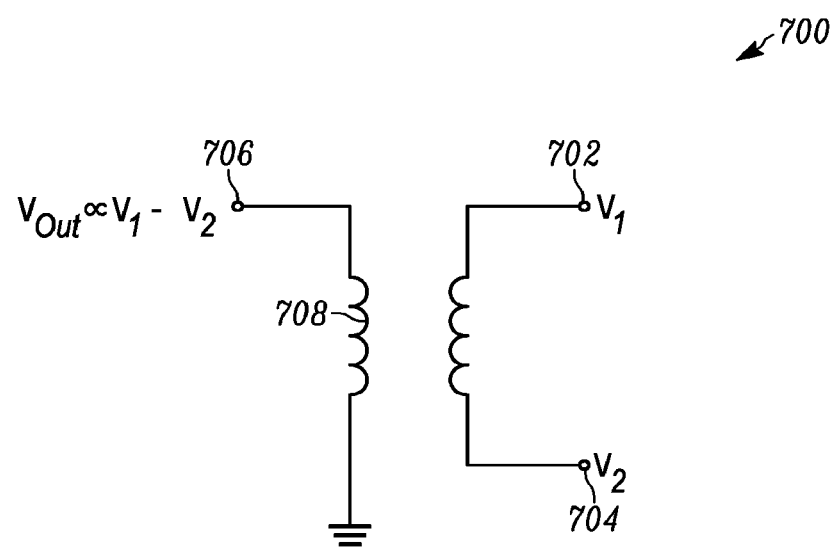
FIG. 7A illustrates an embodiment of balun-type differencing circuit that can be used with the power transfer electrical system according to the present teaching that was described in connection with FIG. 6.

FIG. 7A illustrates a balun-type differencing circuit 700, which is an example of a passive-component embodiment of a differencing function that can be used with the power transfer electrical system according to the present teaching that was described in connection with FIG. 6. The differencing circuit 700 includes a balun component, which is a three-terminal device having a first and second input and an output. The balun shown in FIG. 7A is a two-coil transformer-type balun. One skilled in the art will appreciate that numerous other passive component types, such as a transmission-line transformer balun or a delay line transformer balun can be used to form the differencing circuit according to the present teaching.

Referring to FIGS. 6 and 7A, the differencing circuit 700 can directly replace the difference circuit 602. The antenna Thevenin equivalent circuit 604 is electrically connected to the first input 702 of the differencing circuit 700. The series combination of the fixed load impedance $Z_{load}$ 610 and a controllable voltage source 612 is electrically connected to the second input of the difference circuit 704. In operation, the balun converts a balanced voltage signal comprising the difference of the signal from the antenna Thevenin equivalent circuit 604 and from the series combination of the fixed load impedance $Z_{load}$ 610 and the controllable voltage source 612 into a single signal referenced to ground potential. In one mode of operation, the output of the difference circuit 706 provides a voltage output of the power transfer electrical system 600 that is proportional to the difference between the independent voltage output of the antenna Thevenin equivalent circuit 604 and the voltage output of the series combination of the fixed load impedance $Z_{load}$ 610 and the controllable voltage source 612.

Figure 7B:
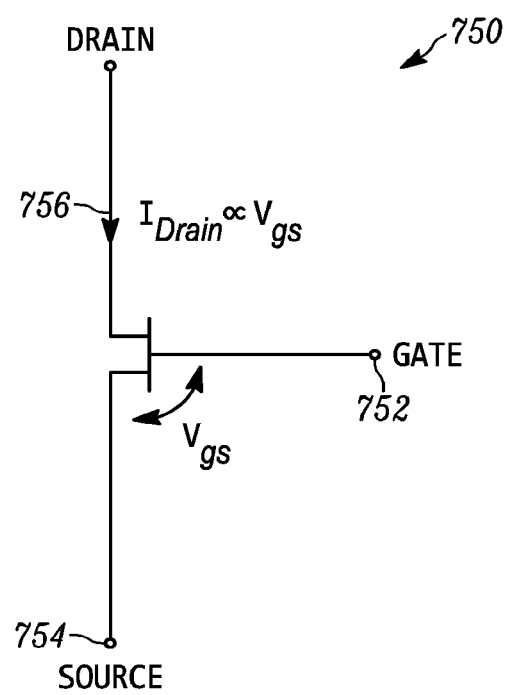
FIG. 7B illustrates an embodiment of a Field Effect Transistor (FET)-type differencing circuit that can be used with the power transfer electrical system according to the present teaching that was described in connection with FIG. 6.

FIG. 7B illustrates a Field Effect Transistor (FET)-type differencing circuit 750, which is an example of an active-component embodiment of the differencing function that can be used with the power transfer electrical system according to the present teaching that was described in connection with FIG. 6. The FET transistor-type differencing circuit 750 includes a gate input electrode 752, a source input electrode 754, and a drain output electrode 756.

Referring to FIGS. 6 and 7B, the differencing circuit 750 can directly replace the difference circuit 602. The antenna Thevenin equivalent circuit 604 is electrically connected to the gate input electrode 752 of the FET-type differencing circuit 750. The series combination of the fixed load impedance $Z_{load}$ 610 and a controllable voltage source 612 is electrically connected to the source input electrode 754 of the FET-type differencing circuit 750. The drain electrode 756 of the FET-type difference device 750 provides a voltage output of the power transfer electrical system 600. In operation, the FET-type transistor differencing circuit 750 provides a voltage signal at the drain output 756 that is proportional to the difference between the voltage output of the antenna Thevenin equivalent circuit 604 and the voltage output of the series combination of the fixed load impedance $Z_{load}$ 610 and the controllable voltage source 612. One skilled in the art will appreciate that numerous other active component types, such as a insulated-gate FET, junction-gate FET, and bipolar transistor can be used to form the differencing circuit according to the present teaching.

Figure 7C:
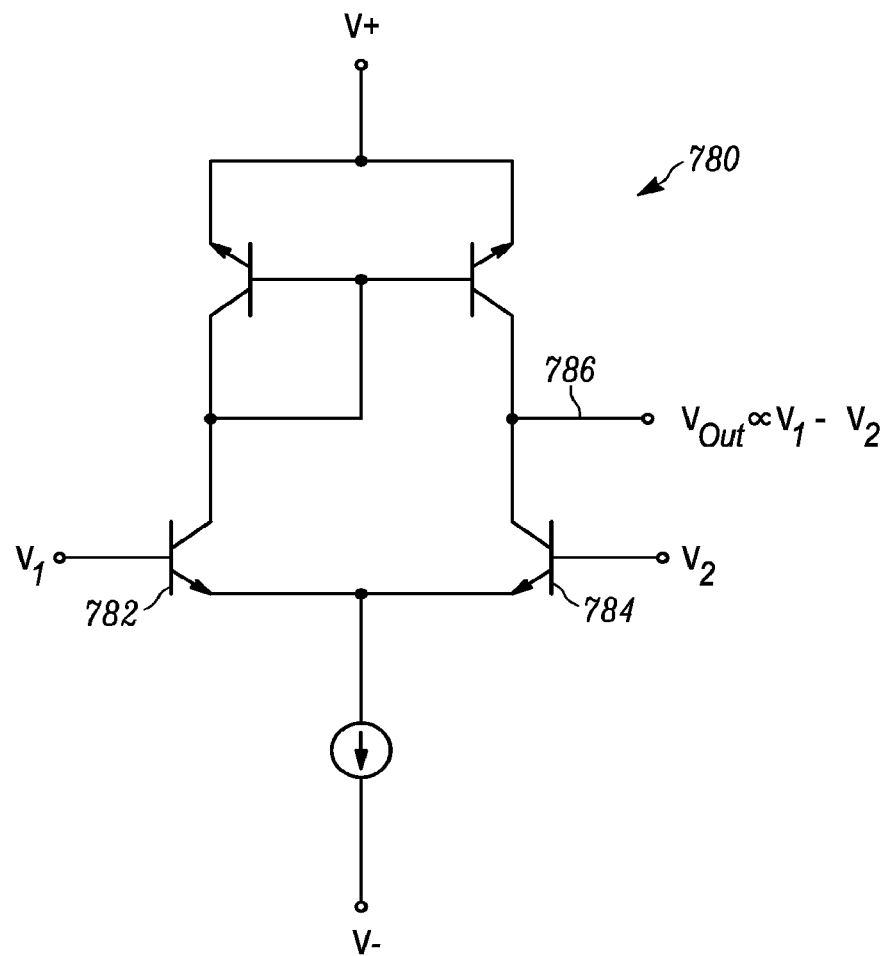
FIG. 7C illustrates an embodiment of a differential amplifier-type differencing circuit that can be used with the power transfer electrical system according to the present teaching that was described in connection with FIG. 6.

FIG. 7C illustrates a differential amplifier-type differencing circuit 780, which is an example of an active-circuit embodiment of the differencing function that can be used with the power transfer electrical system according to the present teaching that was described in connection with FIG. 6. The differential amplifier-type differencing circuit 780 includes a first differential input electrode 782, a second differential input electrode 784, and an output electrode 786.

Referring to FIGS. 6 and 7C, the differencing circuit 780 can directly replace the difference circuit 602. The antenna Thevenin equivalent circuit 604 is electrically connected to the first differential input electrode 782 of the differential amplifier-type differencing circuit 750. The series combination of the fixed load impedance $Z_{load}$ 610 and a controllable voltage source 612 is electrically connected to the second differential input electrode 784 of the differential amplifier-type differencing circuit 780. The output electrode 786 of the differential amplifier-type difference device 780 provides a voltage output of the power transfer electrical system 600. In operation, the differential amplifier-type transistor provides a voltage signal at the output electrode 786 that is proportional to the difference between the voltage output of the antenna Thevenin equivalent circuit 604 and the voltage output of the series combination of the fixed load impedance $Z_{load}$ 610 and the controllable voltage source 612. One skilled in the art will appreciate that numerous other active circuit types can be used to form the differencing circuit according to the present teaching.

One skilled in the art will appreciate that there are numerous variations of the power transfer electrical systems of the present teaching. In particular, one skilled in the art will appreciate that the present teachings are not limited to any particular type of source and load. Furthermore, one skilled in the art will appreciate that the present teachings are not limited to power transfer electrical systems that use a controllable voltage source. For example, any type of active electrical sources may be used in the power transfer electrical systems according to the present teaching, as long as they are dependent on current or voltage generated by the antenna equivalent circuits described herein.

EQUIVALENTS

While the Applicants' teaching is described in conjunction with various embodiments, it is not intended that the Applicant's teaching be limited to such embodiments. On the contrary, the Applicants' teaching encompass various alternatives, modifications, and equivalents, as will be appreciated by those of skill in the art, which may be made therein without departing from the spirit and scope of the teaching.

What is claimed is:

1. A power transfer electrical system comprising:
a) an electrical source circuit comprising an impedance, $Z_{source}$, that generates an electrical signal comprising a first electrical signal comprising a voltage, $V_{Rx1}$, and a second electrical signal comprising a voltage, $V_{Rx2}$, at an output;
b) an electrical sink circuit comprising an impedance, $Z_{Load}$, having an input that is electrically connected to the output of the electrical source circuit;
c) at least one of the electrical source circuit and the electrical sink circuit comprising a controllable electrical element;
d) a differencing circuit having a first input that is electrically connected to the output of the electrical source circuit and a second input that is electrically connected to the input of the electrical sink circuit, the differencing circuit generating a difference signal at an output; and
e) a controller having an input connected to the output of the differencing circuit, and an output connected to the controllable electrical element, the controller generating a control signal that controls the controllable electrical element so that a power, $P_{Load}$ (Total), transferred from the electrical source circuit to the electrical sink circuit is given by an equation:

$$P_{Load}(\text{Total}) = P_{Load}(V_{R\times 1}) + P_{Load}(V_{R\times 2}) = \text{Re}\left\{ \frac{V_{R\times 1}^2(1-A)^2 + V_{R\times 2}^2}{(Z_{Antenna} + Z_{Load})^2} Z_{Load} \right\},$$

wherein the controller determines a value for the controllable electrical element in response to the difference signal that results in a value of variable A that provides a particular portion of the first electrical signal being reflected and simultaneously provides another portion of the second electrical signal being extracted.

2. The power transfer electrical system of claim 1 wherein the differencing circuit is selected from the group consisting of a passive component, an active component, and an active circuit.

3. The power transfer electrical system of claim 1 wherein the differencing circuit comprises a balun-type differencing circuit.

4. The power transfer electrical system of claim 1 wherein the differencing circuit comprises a Field Effect Transistor (FET)-type differencing circuit.

5. The power transfer electrical system of claim 1 wherein the differencing circuit comprises a differential amplifier-type differencing circuit.

6. The power transfer electrical system of claim 1 wherein the electrical source circuit comprises an antenna.

7. The power transfer electrical system of claim 6 wherein the first and second electrical signal generated by the electrical source circuit is generated by driving the antenna with a plurality of signals.

8. The power transfer electrical system of claim 7 wherein at least two of the plurality of signals have different frequencies.

9. The power transfer electrical system of claim 7 wherein at least two of the plurality of signals have different power levels.

10. The power transfer electrical system of claim 7 wherein at least two of the plurality of signals have different frequencies and different power levels.

11. The power transfer electrical system of claim 9 wherein the value for the controllable electrical element determined by the controller is chosen so that a first desirable amount of power is transferred from one of the plurality of signals to the electrical sink circuit and a second desirable amount of power is transferred from another of the plurality of signals to the electrical sink circuit.

12. The power transfer electrical system of claim 1 wherein the electrical sink circuit comprises an electrical signal receiver.

13. The power transfer electrical system of claim 1 wherein the electrical sink circuit comprises a fixed electrical load.

14. The power transfer electrical system of claim 1 wherein the differencing circuit suppresses a common mode voltage.

15. The power transfer electrical system of claim 1 wherein the differencing circuit comprises an active component.

16. The power transfer electrical system of claim 1 wherein the particular portion of the first electrical signal being reflected is nominally the same as the particular portion of the second electrical signal being extracted.

17. The power transfer electrical system of claim 1 wherein the particular portion of the first electrical signal being reflected is substantially different from the particular portion of the second electrical signal being extracted.

18. The power transfer electrical system of claim 1 wherein the particular portion of the first electrical signal being reflected is substantially all of the first electrical signal and the particular portion of the second electrical signal being extracted is substantially all of the second electrical signal.

19. The power transfer electrical system of claim 1 wherein the controller determines the value for the controllable electrical element in response to the difference signal that results in the value of A comprises determining the value for the controllable electrical element in response to the difference signal that results in a complex value of A.

* * * * *